Dec. 31, 1968   P. P. BAZARNIC   3,419,187
DEVICE FOR MEASURING, REGISTERING AND POURING
Original Filed Aug. 31, 1964   Sheet 1 of 4
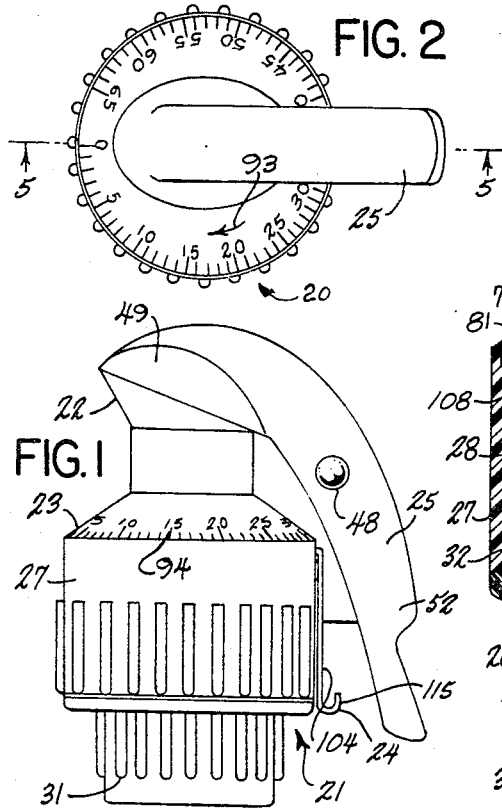
FIG. 2
FIG. 1
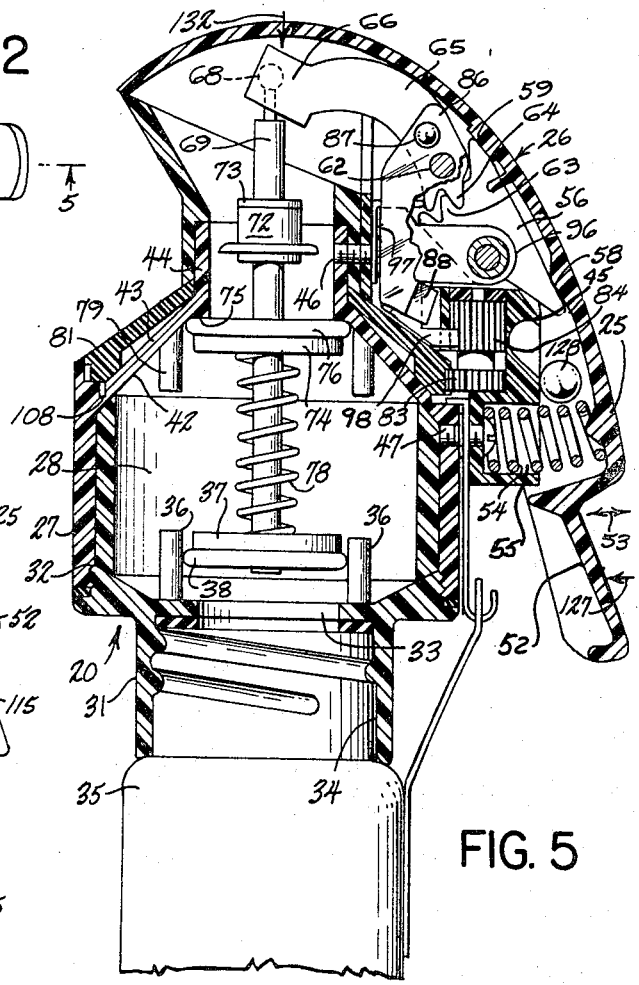
FIG. 5
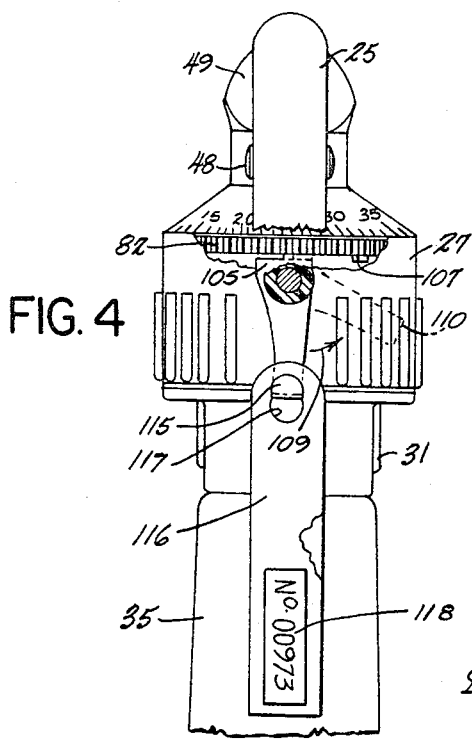
FIG. 4
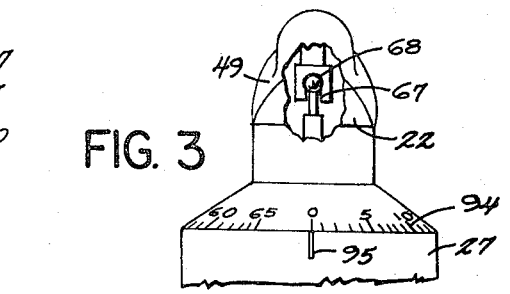
FIG. 3
INVENTOR.
PETER P. BAZARNIC
BY
Dugger, Bradford, Johnson & Westman
ATTORNEYS INVENTOR.
PETER P. BAZARNIC
BY
*Duggan Braddock Johnson & Westman*
ATTORNEYS Dec. 31, 1968   P. P. BAZARNIC   3,419,187
DEVICE FOR MEASURING, REGISTERING AND POURING
Original Filed Aug. 31, 1964   Sheet 3 of 4

INVENTOR.
PETER P. BAZARNIC
BY
Dugger, Braddock, Johnson & Westman
ATTORNEYS

INVENTOR.
PETER P. BAZARNIC
BY
Dugger, Bradford, Johnson & Westman
ATTORNEYS

United States Patent Office 3,419,187
Patented Dec. 31, 1968

3,419,187
DEVICE FOR MEASURING, REGISTERING AND POURING
Peter P. Bazarnic, P.O. Box 24,
Willoughby, Ohio 44094
Continuation of application Ser. No. 544,664, Apr. 12, 1966, which is a continuation of application Ser. No. 393,317, Aug. 31, 1964. This application Nov. 14, 1967, Ser. No. 683,031
17 Claims. (Cl. 222—36)

ABSTRACT OF THE DISCLOSURE

A bottle attachment for measuring, registering, and pouring liquids from the bottle. The attachment includes a lower portion which is sealed into the neck of the bottle and a body portion forming a measuring chamber having an inlet and an outlet. Valves mounted upon a reciprocable shaft inside the measuring chamber are operable to control the passage of liquid through the inlet and outlet. An actuator pivotally mounted on the body controls movement of the reciprocable shaft and is coupled to a counting mechanism for registering the number of times the device is actuated.

---

Figure 6:
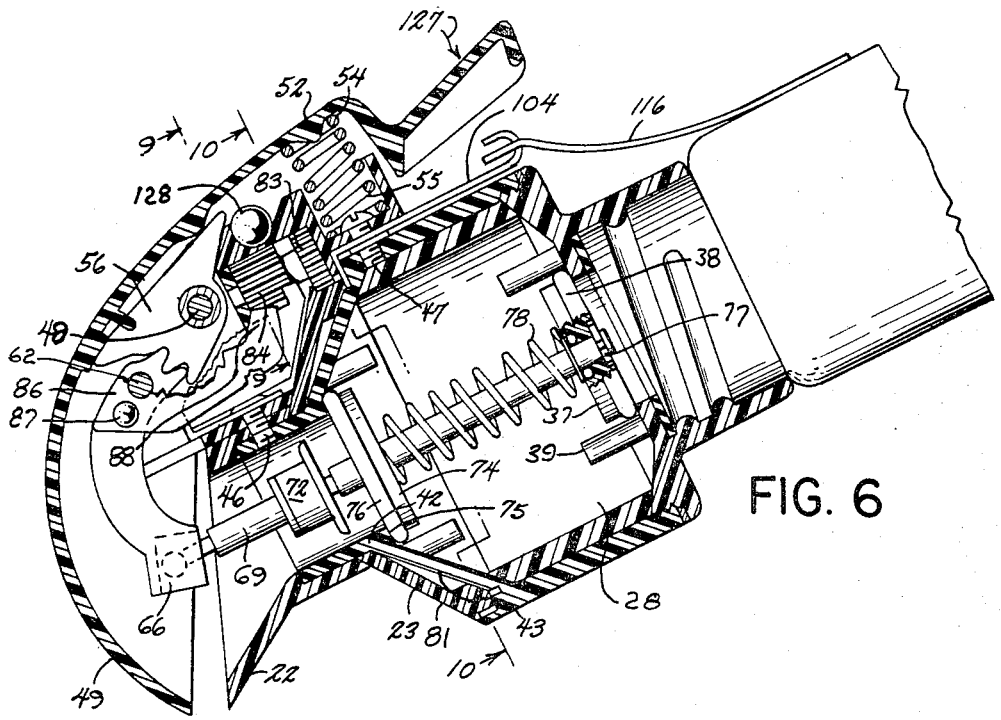

This application is a continuation of my co-pending application, Ser. No. 544,664, filed Apr. 12, 1966, now abandoned, which in turn was a continuation of my application, Ser. No. 393,317, filed Aug. 31, 1964, now abandoned, which in turn was a continuation-in-part of my application, Ser. No. 180,573, filed Mar. 19, 1962, now abandoned.

The present invention has relation to a device for measuring the amount of a liquid dispensed from a bottle, for pouring the measured amount into a container, and for registering the number of times that the measured amount has been dispensed. The present invention is useful where a precise count of the number of measures dispensed from a bottle is essential, as well as the size of each measure. The primary use is in the control of liquors dispensed from bottles, for example, in taverns, but the device can be used on other bottles if desired.

The dispenser is sealed onto the top of a bottle, and is actuated through the use of a handle. Each time the bottle is tipped upside down, a liquid will flow into a measuring chamber and upon actuation of a dispensing handle (the handle can be actuated only when the bottle is upside down) a valve will first seal off the measuring chamber from the bottle, and upon further depression of the actuating handle a second valve will open to permit the liquid to flow from the measuring chamber through a spout. As the handle is moved to open the second valve and let the liquid flow out, it also actuates a registration device to register a higher number. Therefore, the number of times the handle is actuated (and consequently the number of times a measured amount of liquid has been dispensed from the bottle) will immediately be apparent.

A suitable seal is provided so that the measuring and dispensing device cannot be removed from the bottle without breaking the seal. Further, the registration dial cannot be changed in number without breaking the seal. In this manner a tavern owner can keep complete count of the amount of liquor dispensed from each of the bottles used and prevents the bartenders from unknowingly giving away free drinks to friends or perhaps imbibing themselves. The primary use of the device will be in liquor control.

The mechanism is sealed so that it will not leak and the liquor does not contact any of the moving parts or mechanisms.

The registration dial is normally calibrated to record the number of ounces in a bottle to which it is attached. The normal amount dispensed each time is one ounce. However, suitable reducing sleeves can be placed in the dispensing or measuring chamber so that smaller amounts can be dispensed, if desired. As shown, the recording dial is set to record up to 65 actuations before being reset. This would mean that dispensing a one half ounce shot each time would permit the use of the dispenser, as shown, on a quart bottle.

A full measure is dispensed each time with an accurate count made of each measure dispensed. The device is very attractive, easy to use, and completely foolproof.

It is an object of the present invention to present a device for measuring the amount of liquid dispensed from a bottle, registering the number of times this amount has been dispensed and providing suitable pouring spout for dispensing the liquid.

Figure 7:
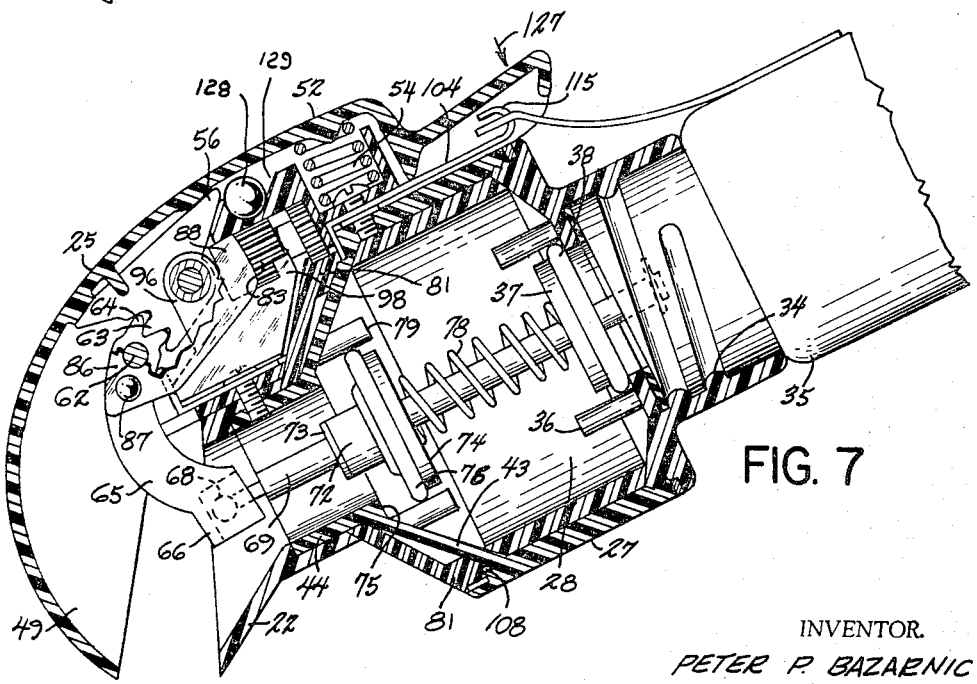
Figure 8:
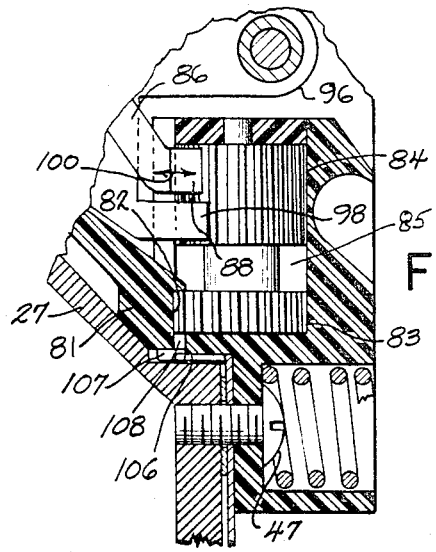
Figure 9:
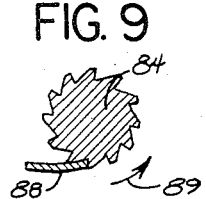
Figure 10:
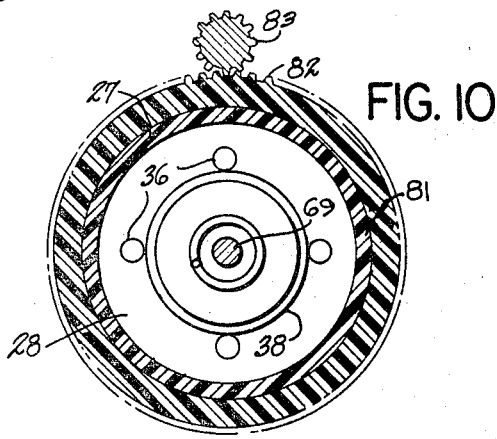
Figure 14:
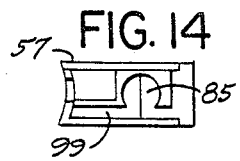
Figure 12:
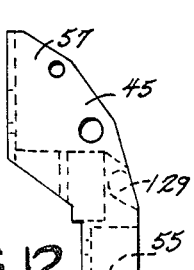
Figure 13:
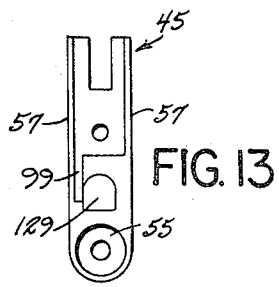
Figure 11:
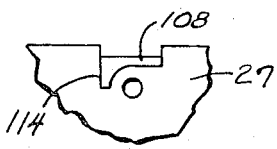
Figure 16:
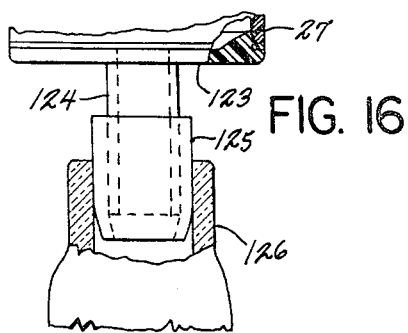
Figure 15:
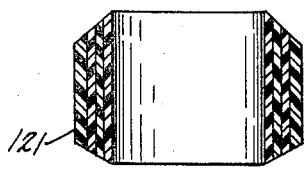
Figure 17:
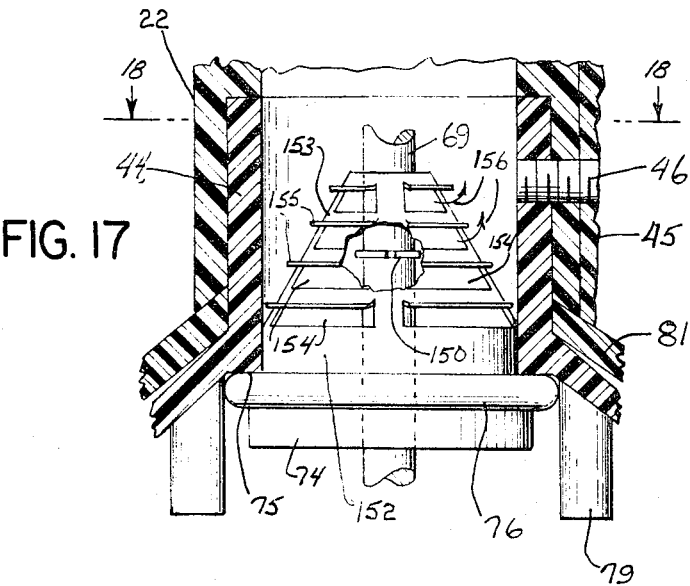
Figure 18:
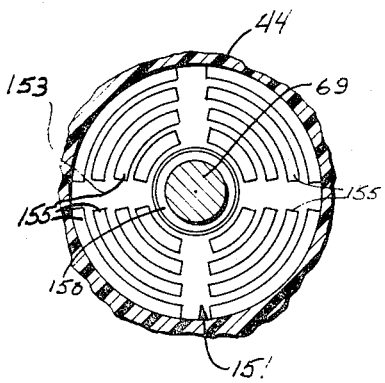

In the drawings,
FIG. 1 is a side elevational view of a dispenser made according to the present invention;
FIG. 2 is a top plan view of the device of FIG. 1;
FIG. 3 is a fragmentary front elevational view of the device of FIG. 1, with parts in section and parts broken away;
FIG. 4 is a rear elevational view of the device of FIG. 1 with parts in section and parts broken away;
FIG. 5 is a vertical sectional view taken as on line 5—5 in FIG. 2;
FIG. 6 is a view taken substantially on the same line as FIG. 5 and showing the dispenser in pouring position wherein the measuring chamber has been sealed from the bottle to which it is attached and before the liquid is dispensed from the chamber;
FIG. 7 is a view taken substantially on the same line as FIG. 6 showing the device in position for permitting the liquid in the measuring chamber to be discharged from the dispenser;
FIG. 8 is a fragmentary enlarged sectional view of a drive gear assembly for the recording mechanism of the dispenser of the present invention;
FIG. 9 is a sectional view taken as on line 9—9 in FIG. 6;
FIG. 10 is a sectional view taken as on line 10—10 in FIG. 6;
FIG. 11 is a fragmentary enlarged rear elevational view showing an actuator slot for the registration dial mechanism of the device of FIG. 4;
FIG. 12 is a side elevational view of a mounting bracket for the actuator mechanism utilized with the device of the present invention;
FIG. 13 is a rear elevational view of the device of FIG. 12;
FIG. 14 is a top plan view of the device of FIG. 12;
FIG. 15 is a vertical sectional view of a plurality of inserts utilized for reducing the capacity of the dispenser chamber of the device of the present invention;
FIG. 16 is a fragmentary sectional view of a modified form of the attachment device utilized with the dispenser of the present invention;
FIG. 17 is a fragmentary enlarged sectional view of the upper valve portion of a dispenser made according to a modified form of the present invention showing an antitamper guard in place; and
FIG. 18 is a sectional view taken as on line 18—18 in FIG. 17.

Referring to the drawings and the numerals of reference thereon, a liquid dispenser illustrated generally at 20 includes an outer housing assembly 21; a pouring spout 22; a recording dial 23; a lock tab 24; an actuating handle 25; and suitable actuating mechanism illustrated generally at 26. The dispenser will dispense the liquid, measuring the amount dispensed, and recording the number of times this amount has been dispensed.

The outer housing 21 includes a center measuring section 27, which, as shown, has an interior measuring chamber 28. An adapter 31 is threadably mounted as at 32 to the interior of the center section 27 and is sealed with a gasket to close the bottom portions of the chamber 28. The adapter 31 has an open center port 33 and has internal threads illustrated at 34 which will fit onto the top of a bottle 35 of liquid, for example, liquor.

A plurality of cylindrical upright guides 36 are placed in spaced relationship around the port 33 and extend into the chamber 28. The guides 36 are used for guiding a valve disc 37 that is aligned with port 33. The valve disc 37 has an O-ring 38 thereon which, as will be fully explained, seats against the surfaces adjacent port 33 and seals the port from the interior of bottle 35. In normal position, as shown in FIG. 5, valve disc 37 is spaced from the port 33 and liquid from the bottle can flow into the chamber 28 between the pegs 36 when the bottle is tipped.

The center measuring housing 27 has an upper funnel shaped portion 42. As shown, the funnel shaped portion 42 includes a conical section 43 and a tubular cylindrical outlet section 44.

The pouring spout 22 is attached to the outlet section 44 and is open thereto.

A mounting bracket 45 is fixedly attached with a suitable screw 46 to the outer surface of the housing 27 at the outlet section thereof which is also attached with a screw 47 to the side wall or main portion of the center measuring section.

The mounting bracket 45 is used to house and support the mechanism 26 for actuating the dispenser.

The handle 25, as shown, is pivotally mounted on a suitable pin 48 to the bracket 45. The handle 25 is pivotable about pin 48. The handle includes a cover section 49 which fits over the pouring spout and will close off the pouring spout when the handle is in normal position. As shown, the handle has a large internal recess, or in other words has a U-shaped cross-section The lower section 52 of the handle is movable toward and away from the housing 27 in direction as indicated by double arrow 53. A spring 54 is mounted in a suitable receptacle 55 on the bracket 45 and also bears against the inner surface of the lower section of the handle 52. Spring 54 urges the lower section of the handle outwardly and thereby urges the cover section 49 against the pouring spout.

An actuator bell crank 56 is also pivotally mounted on a bushing over pin 48 and moves about the same axis as the handle 25. The actuator bell crank is mounted between the outer legs of the handle and also between a pair of upwardly extending flanges 57, 57 on the bracket 45. Opposite end portions of the bell crank 56 are positioned against a first lug 58 and a second lug 59, both of which are integral with the outer wall of the handle 25. The lugs 58 and 59 contact portions of the bell crank on opposite sides of the pin 48 and thus, when the handle is pivoted about pin 48 the bell crank 56 will also be pivoted about this pin.

The outer edge portion of the bell crank 56 has a gear sector 63 defined therein. The gear sector 63 meshes with a second gear sector 64 which in turn is defined in the outer end portion of an actuator arm or lever 65. The actuator arm or lever 65 is pivotally mounted on a pin 62 and is positioned between the flanges 57, 57 of the mounting bracket 45. The pin 62 is mounted in these flanges and the actuator arm will pivot about the pins. The upper outer end portion of arm 65 has a lug 66 integral therewith. The lug 66 has a T-slot 67 defined therein, as can be seen in FIG. 3. This T-slot 67 is of size to receive a ball 68 which is integral with the outer end of a shaft 69. Shaft 69 extends downwardly through the narrow section of the slot 67. The slot 67 of the lug 66 thus forms a ball joint with the ball 68.

The shaft 69 is enlarged at its lower portions and carries a disc 72. The disc 72 is held from sliding upwardly on the shaft by a retaining ring 73. A second valve disc 74 is also slidably mounted on the shaft 69 and is positioned to engage edge surfaces 75 defining the outlet port in the outlet section 44. An O-ring 76 is also mounted on the valve disc 74 to seal against the edge surfaces 75.

First valve disc 37 is also slidably mounted on the shaft 69 and is held from falling off the lower end of the shaft 69 by a retaining ring 77 which is placed in a suitable groove in the lower portions of the shaft. A compression coil spring 78 is positioned between discs 37 and 74 and exerts resilient force against these discs tending to separate them. The spring 78 acts through a washer at each end which rests on an O-ring mounted in each disc and sealing on the shaft 69 as shown typically in FIG. 6. The discs 72 and 74 are loosely mounted on shaft 69 so that they can self align when sealing off their respective ports. The O-ring on the shaft 69 prevents leaks even with the loose fit of the discs. The small washers distribute the spring load to the O-ring evenly.

With the handle in its normal position shown in FIG. 5, the resilient force will be carried by the retaining ring 77 and the spring 78 will urge second valve disc 74 against the surface 75. The spring 54 for the handle will prevent the spring 78 from pulling the shaft downwardly further. This will leave the first valve disc 37 spaced from port 33 so that liquid can flow into the chamber 28 when the bottle is tipped to inverted position.

Also, it should be noted that suitable cylindrical guide pegs 79 are integral with the funnel shaped portion 43 and are positioned to guide the second valve disc 74 in its movement.

Movement of the valve disc will be more fully explained as the description proceeds.

The registration dial 23 comprises a part conical member as shown at 81 which is rotatably mounted on the outer surface of the conical portion 43 of the funnel shaped section of the center housing. The registration dial is held in place by the pouring spout 22 and can rotate with respect to the center section 27.

Outer edge portions of the cone shaped member 81 are formed as gear teeth 82. The gear teeth 82 are made to mesh with a suitable spur gear 83 which in turn is integral with a ratchet wheel 84. The ratchet wheel 84 and spur gear 83 are coaxial and form an assembly. The gear assembly is rotatably mounted about a substantially upright or vertical axis in a provided receptacle 85 on the bracket 45.

A ratchet dog 86 is mounted onto actuator arm 65. The ratchet dog 86 is mounted on pin 62 and is held from pivoting with a second pin 87. The dog 86 moves in an arc whenever the actuator arm 65 pivots about pin 62. As the arm 65 is pivoted about pin 62 the ratchet dog 86 has an end portion 88 which will engage the ratchet wheel 84 and move the wheel in direction as indicated by arrow 89 in FIG. 9. At the same time the gear 83 will be rotated and this gear, which meshes with gear teeth 82 on the registration dial 23, will cause the dial to rotate in direction as indicated by arrow 93 in FIG. 2.

The actuator dog 86 is moved whenever the arm 65 is moved, and it will drive the ratchet wheel when the bottom portion 52 of the handle is moved inwardly toward the housing, against the action of spring 54. The unit is made so that the registration dial moves a predetermined amount. As shonw in FIGS. 1, 2 and 3, the outer surface of the registration dial 23 has suitable indicia 94 thereon. The indicia is marked off in units from 0 to 65. As shown a suitable mark 95 is placed on the outer surface of housing 27 and each time the actuator dog 86 moves the ratchet wheel 84, the registration dial will be rotated to one higher number in relation to the mark 95. This will indicate that the handle has been actuated one additional time. The purpose of this will be more fully explained later.

A stop bracket 96 is mounted onto a bushing over pin 48 and has an upper portion that is held against an L-shaped bracket 97 that is held by screw 46. The stop bracket 96 has an outer end portion 98 which is held stationary and rides against the lower end portion of ratchet wheel 84. The end portion 98 is curved to exert a uniform resilient force against the ratchet teeth and will engage the ratchet teeth to prevent the ratchet wheel from rotating in direction opposite that indicated by arrow 89.

The end portion 88 of the actuator dog 86 engages the ratchet wheel 84 above the end portion 98 of stop bracket 96. This can perhaps best be seen in FIG. 8. The end portion 98 will insure that the ratchet wheel 84 will not back up when the dog returns to its normal position.

The dog 86 and the stop bracket 96 are positioned within a provided slot 99 (see FIG. 14), defined in mounting bracket 45. The actuator dog 86 will move back and forth in direction as indicated by double arrow 100 (see FIG. 8).

A locking lever 104 is pivotally mounted about screw 47 between the outer surface of housing 27 and the inner surface of the downwardly extending portion of the bracket 45. The locking lever 104 has an upwardly extending lug 105 which in turn has an inwardly extending end portion 106. The inwardly extending end portion 106 is adapted to seat within a provided slot 114 on the housing 27 and the end portion 106 of the lug 105 is positioned immediately below the gear teeth 82 on the conical member 81 of the registration dial.

A small stop peg 107 integral with the conical member 81 depends downwardly from the conical member. The stop peg moves in a provided annular track 108 defined in the housing 27. The end member 106 of the lug 105 (when the locking lever 104 is positioned as shown in FIG. 4) is positioned to extend across the annular track 108. With the locking lever in position as shown in FIG. 4 the end portion 106 will intercept the stop peg when the registration dial has moved around this far about its axis of rotation.

When the registration dial has rotated one complete revolution the peg 107 will intercept the end portion 106 and be prevented from rotation. The locking lever 104 can be rotated in direction as indicated by arrow 109 to position as shown in dotted lines at 110. In this position the end portion 106 will rotate downwardly and enter a provided receptacle 114. When the locking lever 104 has been pivoted to position as shown at 110 the end portion 106 will be below the peg 107 and the registration dial can be rotated past this position.

The lower end portion of lever 104 is formed into a U-shape as shown at 115. A seal member 116 has an opening 117 that fits over the U, and the other end of the seal is pressed against the upper surface of the bottle to which the dispenser is attached. The seal member 116 is made of a suitable flimsy paper with a very tough adhesive backing so that once the seal member is placed onto a surface such as the surface of a bottle, it cannot be removed from the surface without tearing the seal member or in some way mutilating it. With the seal in position as shown in FIGS. 4 and 5, the locking lever 104 cannot be pivoted to position wherein it will release the peg 107 without breaking this seal. The seal can have a suitable serial number 118 thereon.

The volume of chamber 28 is known and therefore the amount of liquid which will fill the chamber is also known. The volume of chamber 28 can be varied with the structure shown in FIG. 15. As shown, there are a plurality of nested rings 121 of different thicknesses. The rings 121 will fit within the chamber 28 and will take up part of the space therein. The chamber 28 will be correspondingly reduced in capacity and the amount of liquid necessary to fill the chamber can correspondingly be changed. The standard chamber size is one and one-fourth fluid ounce. This can be reduced to one-half ounce by using all of the rings shown at 121 in FIG. 15. Intermediate volumes of 1 oz.; ⅞ oz.; ¾ oz. and ⅝ oz. are also available.

Also, shown in FIG. 16, is an alternate adapter for fitting the dispenser assembly onto the top of a bottle. As shown the end bottom portion of the adapter 31 is screwed out of housing 27 and a different adapter 123 is screwed into place. Adapter 123 is the straight "push on" type which can be used with a cork sealed bottle. The straight or push on adapter 123 (as shown in FIG. 16) has a tubular neck 124 and a rubber or other high friction material collar 125 thereon. The collar 125 can be of different inside and outside diameters to fit specific bottles. As shown, the adapter 123 and collar 125 are slipped into the upper neck of a bottle 126. The unit is simply pushed into place and will remain at the top of the bottle for use.

The lower portion 52 of the handle is prevented from moving inwardly toward the housing 27, as indicated by arrow 127 when the bottle is in an upright position (see FIG. 5). A detent ball 128, is placed between the bracket 45 and the inner surface of the handle. Ball 128 is held in place by the legs of the handle. When the bottle is tipped upside down as shown in FIGS. 6 and 7, the ball 128 will move into a provided receptacle 129 in the bracket 45. The lower section of the handle 52 can then be moved to a dispensing position as shown in FIG. 7, against the action of the spring 54.

The device is specifically designed for controlling and recording the amount of liquid dispensed from each bottle on which it is placed. This is particularly important in control of the amount of liquor dispensed from bottles in bars.

When the device is to be used, the registration dial is set to zero by moving the lever 104 to position as shown at 110 and rotating the dial so that the peg 107 goes past the lug 106 and the zero indicia on the registration dial is aligned with the mark 95 as shown in FIG. 3. The unit is then screwed onto a bottle and a suitable sealing strip 116 is put into place. The opening 117 of the seal is placed over the U-shaped member 115 and the bottom portion of the seal is tightly adhesively affixed to the outer surface of the bottle neck. The seal is stretched taut so that the lock member 104 cannot be moved without breaking the seal. Also, the unit cannot be unscrewed or pulled out of the top of the bottle without breaking this seal.

Assuming that the chamber 28 is of size to contain one ounce of liquid, and a one ounce shot of liquid is to be dispensed from the bottle, the bottle is then merely tipped upside down as shown in FIG. 6. When the bottle is tipped downward the liquid flows through port 33 into measuring chamber 28, past valve disc 37, which is in opened position. The liquid flows between the guide pegs. The valve disc 74 is in its normal position against the surface 75 and the outlet to the chamber 28 is completely sealed so that the liquid in the chamber cannot be poured out.

By actuating the handle to position as shown in FIG. 6 against the action of spring 54, bell crank 56 will pivot about shaft 48 and the gear sector 63 will actuate gear sector 64 on the actuator arm 65 and will push the actuator arm about its pivot pin 62 so that the outer lug portion 66 of the actuator arm will force the shaft 69 in direction as indicated by arrow 132. This will move the shaft 69 axially toward the bottle. This will force the spring loaded valve disc 37 onto its seat shutting off port 33, thereby entrapping the liquid contained in chamber 28. As the actuator arm 65 forces shaft 69 in its downward movement, the handle simultaneously transmits motion causing the cover to open as it swings about the pivot pin 48 of the handle. However, the entrapped liquid is not yet released from the chamber 28.

Since valve disc 37 is forcefully loaded by a compression spring 78 against the retaining ring 77, the disc 37 follows the shaft until it contacts its seat at which point it comes to rest. During this time the shaft 69 is sliding through the hub of spring loaded valve disc 74, which is forced tight against its respective seat 75 at the opposite end of measuring chamber 28 by said compression spring 78. This prevents the liquid from pouring out until the valve 74 is released by disc 72 contacting the hub of valve disc 74 forcing the valve disc downward to provide adequate passage of liquid between said valve disc 74 and its respective seat 75.

After the valve disc 37 has closed off port 33 and before valve disc 74 moves away from seat 75, a pre-determined amount of free travel of shaft 69 permits the middle portion of the stroke of the handle to move the end portion 88 of actuator dog 86 against the ratchet wheel 84 and rotate the ratchet wheel 84 and spur gear 83 a sufficient amount to rotate the registration dial one number. This will indicate that an additional one ounce quantity will be served.

The object is to register a number before the valve 74 opens to pour a drink. Also the same prinicple must be used on the reverse stroke. That is, when the handle is on its way back to a normally closed position, the actuator dog 86 is reset before the valve disc 37 opens to permit liquor to come in from the bottle into the measuring chamber.

Hence, while the drink is being poured, spring 78 keeps disc 37 tightly against the surfaces defining port 33 with a predetermined longitudinal clearance between disc 37 and retaining ring 77. After the drink is poured and handle 25 is on its way back to a normally closed position, end portion 88 of actuator dog 86 must retract sufficiently to reset itself before retaining ring 77 will move disc 37 away from port 33. This will prevent liquid coming into the measuring chamber and then out pouring spout should the handle 25 be suddenly reversed, before the completion of its full travel and will prevent dispensing without actuating the dial registration.

Before any additional liquid can be dispensed the handle must be released so that the valve disc 37 moves away from port 33. This will not occur until the handle is completely released to the last portion of its stroke. Before the disc 37 and O-ring 38 move away from port 33 and open it, the disc 74 will have sealed on surface 75. The actuator dog 86 will reset previously, as explained, and any time the handle is again actuated to dispense liquid an additional number will be recorded on the registration dial.

If the bottle is placed in upright position as shown in FIG. 5, the ball 128 will roll to position to prevent the handle from being actuated. This will prevent recording of an additional number on the registration dial when no liquid is being dispensed.

In order to insure that the dispenser is not tampered with, and in particular to prevent small members, such as wires or nails from being inserted in through the pouring lip in an attempt to hold the valves on the measuring chamber away from their seat without actuating the registration dial (or prevent the valves from seating after dispensing), the modification illustrated in FIGS. 17 and 18 can be utilized. The dispenser is exactly the same in construction and operation as previously described with the exception that the actuator shaft 69 does not include the retaining ring 73 and disc 72 but has a separate retaining ring 150 mounted thereon in spaced relationship to the valve disc 74, as shown. In FIG. 17 the unit is shown in closed position, or in a position similar to that in FIG. 5. It can be seen that in this position the valve disc 74 is in place with the O-ring 76 thereon against the seat 75 defining the outlet to the measuring chamber. The pegs 79 are positioned around the valve disc 74 and hold the disc concentric with the shaft as previously explained.

The modification in this form of the invention involves the use of an anti-tamper device illustrated generally at 151 which is press fitted within the outlet section 44 of the dispenser. The lower portion 152 of the anti-tamper device are substantially cylindrical and fit against the cylindrical wall of the outlet section 44. The anti-tamper device is made to have a substantially conical hollow upper section, as illustrated at 153 and the conical section is truncated. The anti-tamper device is initially formed to have a continuous conical wall 153. The rod 69 extends through the open center of the conical section and engages the valve disc 74 in a manner previously described. The rod 69 is also actuated as previously described.

Walls of the upper section 153 of the anti-tamper device are partially punched out, to form a plurality of individual slot segments or apertures 154 along the wall of the anti-tamper device. The material punched out forms small louvers or baffles 155 which extend at substantially right angles to the axis of shaft 69. The louvers or baffles 155 as can be seen in FIG. 18, provide a substantially horizontal cover overlying but not sealing each of the slots 154.

The baffles 155 are thus positioned so as to prevent a wire, nail or other small objects from being run through the opening of the outlet section 44 and down through the apertures 154 in axial direction into contact with valve disc 74 and from thence into contact with the lower valve discs 37. However, the slots or apertures 154 will permit liquid to flow outwardly into the outlet section 44 as shown by arrows 156 whenever the bottle is tipped and then actuated properly.

The anti-tamper device prevents the valves from being held open without actuating the registration dial so that the liquor in the bottle could be removed without registration of the quantity on the dial.

The baffles 155 extending at right angles to the axis of shaft 69 in axial direction so as to prevent the insertion of objects through the slots 154 insures that proper control of the liquid in the bottle is maintained at all times.

When the handle of the dispenser is actuated, the snap ring 150 will operate the valve disc 74 in exactly the same manner as the disc 72 did in the first form of the invention.

The owner of a bar can now immediately check to see how many shots of liquor have been dispensed from each bottle and can check this information with the receipts to see that he is being paid for each shot of liquor being dispensed. Once all the liquor in a bottle has been dispensed, the number of shots that are dispensed can be noted, the seal broken and the dispenser placed on a new bottle.

The units can be used for mixing drinks as well. The bottles having the dispensers attached to the tops are inverted and placed in a rack or support. The bottles are held in this inverted position. In order to mix a drink, the bartender will dispense a measured shot of one type of liquid from one bottle, by depressing the handle, and then will add a shot of the other liquid used in the drink into the same glass. The mixing will take place right in the glass.

The dispenser will work in exactly the same manner as described previously. The outlet valve with the O-ring seal will not leak.

What is claimed is:

1. A measuring dispenser for mounting on the top of a bottle or the like, said dispenser including a housing, means for mounting said housing in sealing relationship to the bottle, an interior chamber within said housing, said interior chamber having an inlet opening communicating with the interior of the bottle on which said housing is mounted, first valve means for controlling flow through said inlet opening, an outlet opening from said chamber, second valve means for controlling flow through the outlet opening, actuator means for controlling said valve means to permit dispensing of a measured quantity of liquid from said chamber, said first and second valve means comprising valve disc members inside said chamber, said actuator means including an actuator shaft slidably mounted with respect to both of said valve discs, bias means urging each of said valve discs toward its respective opening, stop means on said actuator shaft to control movement of the valve discs against the action of said bias means, and seal means between each of said valve discs and said shaft comprising a separate ring sealing member contiguous with each of said discs and each having an internal surface slidably sealing on said shaft, said bias means bearing on a side surface of said ring member, each ring member transferring force from the bias means to its respective disc.

2. The combination as specified in claim 1 wherein annular recesses are defined in each of the valve disc members, said recesses being of size to receive the ring members.

3. The combination as specified in claim 1 wherein the bias means is comprised as a single spring surrounding said shaft and positioned between said valve discs.

4. The combination as specified in claim 1 and a plurality of spaced upright pegs adjacent opposite ends of the chamber, said pegs being positioned to guide said valve discs.

5. The combination as specified in claim 1 and sealing means adjacent the periphery of the valve discs comprising a separate sealing ring member mounted on each of the discs and having a side surface which surrounds the respective openings and seals against portions of the housing.

6. A measuring dispenser for mounting on the top of a bottle or the like, said dispenser including a housing, means for mounting said housing in sealing relationship to the bottle, an interior chamber within said housing, said interior chamber having an inlet opening communicating with the interior of the bottle on which said housing is mounted, first normally open valve means for controlling flow through said inlet opening, an outlet opening from said chamber, second normally closed valve means for controlling flow through the outlet opening, actuator means movable in a direction to first move said first valve means to a closed position closing off said inlet opening and subsequently move said second valve means to position wherein said outlet opening is open, and counting mechanism movable to sequentially higher numbers each time said actuating mechanism is moved to open said second valve means, said first and second valve means comprising disc-shaped valve members inside said chamber each having sealing means thereon for closing off their respective openings, said actuator means including an actuator shaft slidably mounted with respect to both of said valve discs, bias means urging each of said valve discs toward its opening, first stop means on said actuator shaft engaging said first valve means and positioned to hold said first valve disc in open position with said actuator means in its normal position, and second stop means on said actuator shaft positioned to engage said second valve disc and move it to open position after said actuator means has moved a sufficient distance to permit said first valve disc to seal said inlet opening, said actuator means further including a bell crank pivotally mounted on said housing, an actuator handle pivoted about the same axis as said bell crank, said handle having means thereon to engage said bell crank and move the bell crank when it pivots about its axis, bias means urging said handle in a first direction to a first normal position, a first gear sector integral with said bell crank, an actuator lever pivotally mounted to said housing about an axis spaced from the pivotal axis of said bell crank, said actuator lever having a second gear sector adapted to mesh with the gear sector on said bell crank, and a driving connection between said actuator shaft and said actuator lever, said actuator lever being positioned so as to move said shaft axially whenever said handle is moved away from its normal position.

7. The combination as specified in claim 6 and a detent ball positioned between an actuating portion of said handle and said housing, said detent ball being of size to prevent said handle from being moved from said normal position whenever the container to which said dispenser is attached is in position with the outlet opening of the dispenser facing upwardly, and a receptacle in said dispenser housing of size to receive said ball and permit said handle to be moved from said normal position whenever said container is inverted.

8. A device for measuring the amount of liquid dispensed from a container having a discharge opening, said device including a housing defining an interior chamber, means for mounting said housing on the top of said container and in fluid tight relationship to the discharge opening, said chamber having an inlet opening and an outlet opening coaxially aligned, said inlet opening being positioned to communicate with the interior of said container, an actuator shaft mounted for movement along the axes of said openings, a first valve disc slidably mounted on said shaft, bias means urging said first valve disc in direction toward a first end of said shaft, first stop means on said shaft to prevent movement of said disc relative to said shaft toward a first end of the shaft beyond a predetermined point, a second valve disc slidably mounted on said shaft, bias means urging said second valve disc toward a second end of said shaft, second stop means on said shaft to prevent movement of said second valve disc with respect to the shaft toward a second end of the shaft beyond a predetermined point, actuator means for controlling said shaft, third bias means to urge said shaft toward a first normal position wherein the first valve disc is against first stop means and the second valve disc seals off the outlet opening and is spaced from the second stop means, said actuator means being operable to move said shaft against the action of said third bias means to position wherein said first valve disc seals the inlet opening of said chamber and upon further movement of the shaft in the same direction the second stop means will contact said second valve disc and move it away from the outlet opening, counting mechanism adapted to register one higher number each time said actuator means is moved to position to move said second valve disc away from the outlet opening, said actuator means including a bell crank pivotally mounted on said housing, an actuator handle pivoted about the same axis as said bell crank, said handle having means thereon to engage said bell crank and move the bell crank when it pivots about its axis, said third bias means urging said handle in a first direction to a first normal position, a first gear sector integral with said bell crank, an actuator lever pivotally mounted to said housing about an axis spaced from the pivotal axis of said bell crank, said actuator lever having a second gear sector adapted to mesh with the gear sector on said bell crank, and a driving connection between said actuator shaft and said actuator lever, said actuator lever being positioned so as to move said shaft axially whenever said handle is moved away from its normal position.

9. The combination as specified in claim 8 and a detent ball positioned between an actuating portion of said handle and said housing, said detent ball being of size to prevent said handle from being moved from said normal position whenever the container to which said dispenser is attached is in position with the outlet opening of the container facing upwardly, and a receptacle in said dispenser housing of size to receive said ball and permit said handle to be moved from said normal position whenever said container is inverted.

10. The combination as specified in claim 9 and a dispensing spout open to the outlet opening of said chamber, and a cap member integral with said handle adapted to fit over said dispensing spout when said handle is in said normal position, said cap portion moving away from said dispensing spout whenever said handle is moved away from said normal position.

11. A device for recording the amount of liquid dispensed from a container, said device including a housing defining an interior chamber, means for mounting said housing on the top of said container in fluid tight relationship thereto, said chamber having an inlet opening and an outlet opening, said inlet opening being positioned to communicate with the interior of said container, first normally open valve means within said chamber for controlling flow through said inlet opening, second normally closed valve means in said chamber for controlling flow through said outlet opening, actuating means for said valve means, said actuating means being movable to position to permit said first valve means to be released so that it will close said outlet opening, said actuating means further being movable to position to open said second valve means with said first valve means closed, and an anti-tamper unit overlying the normally closed valve means on said outlet opening, said anti-tamper unit being fixed with respect to said housing and having perforations through which liquid will flow, and a baffle means on said anti-tamper device positioned to overlie said perforations in relationship to prevent inserting any object from the exterior of said device axially through said perforations.

12. A measuring dispenser for mounting on the top of a bottle, said dispenser including a housing, means for mounting said housing in sealing relationship to the bottle, an interior chamber within said housing, said interior chamber having an inlet opening communicating with the interior of the bottle on which said housing is mounted, first normally open valve means for controlling flow through said inlet opening, an outlet opening from said chamber, second normally closed valve means for controlling flow through the outlet opening, actuator means movable in a direction to first move said first valve means to a closed position closing off said inlet opening and subsequently moving said second valve means to position wherein said discharge opening is open, a recycling non-reversible counting mechanism movable to sequentially higher numbers each time said actuating mechanism is moved to open said second valve means, up to a predetermined maximum number, releasable lock means on the dispenser to prevent movement of said counting mechanism past the predetermined maximum number, and easily destructable seal means between said lock means and the bottle on which the dispenser is mounted, said seal means being mutilated whenever the lock means is moved to released position to permit recycling of said counting mechanism.

13. The combination as specified in claim 12 wherein the counting mechanism is comprised as a counting member rotatably mounted on the dispenser and having a plurality of evenly spaced marks around the periphery thereof, a stationary mark on the dispenser in close proximity to the counting member, a stop peg on the counting member, and wherein the lock means has a lug movable from position wherein it will intercept said peg and prevent rotation of the counter member to released position wherein the lug will clear said peg.

14. The combination as specified in claim 12 and a plurality of inserts of known volume adapted to be positioned within the interior chamber.

15. A measuring dispenser for mounting on the top of a bottle or the like, said dispenser including a housing, means for mounting said housing in sealing relationship to the bottle, an interior chamber within said housing, valve means to permit liquid to flow into the chamber from the bottle and to permit a measured quantity of liquid to flow out of the chamber, actuator means to control said valve means, a recycling non-reversible counting mechanism movable to sequentially higher numbers each time said actuating mechanism is moved to actuate said valve means to permit a measured quantity of liquid to flow out of the chamber up to a predetermined maximum number, releasable lock means on the dispenser to prevent movement of said counting mechanism past the predetermined maximum number, and easily destructable seal means between said lock means and the bottle on which the dispenser is mounted, said seal means being mutilated whenever the lock means is moved to released position to permit recycling of said counting mechanism.

16. The combination as specified in claim 15 wherein said seal means includes a pressure sensitive adhesive backed frangible strip at least a portion of which contacts the bottle.

17. A measuring dispenser for mounting on the top of a bottle or the like, said dispenser including a housing, means for mounting said housing in sealing relationship to the bottle, a cylindrical interior chamber within said housing, said interior chamber having an inlet opening communicating with the interior of the bottle on which said housing is mounted, an outlet opening from said chamber, separate valve means operable substantially along the axis of the chamber controlling flow through the respective openings, actuator means to operate said valve means to permit dispensing a measured quantity of liquid from the chamber, and a plurality of separable snugly fitting concentric cylindrical inserts of known volume and of size so they may be positioned within the chamber in surrounding relation to the valve means to reduce the effective volume of the chamber a preselected amount, the outermost of said cylindrical inserts fitting within the wall of said chamber, and the innermost insert being of size to clear said valve means to allow operation of said valve means.

References Cited

UNITED STATES PATENTS

| | | | |
|---|---|---|---|
| 2,106,649 | 1/1938 | Officer | 222—447 X |
| 2,158,948 | 5/1939 | Rubens | 222—447 X |
| 3,080,097 | 3/1963 | Schmaus | 222—189 |

FOREIGN PATENTS

| | | |
|---|---|---|
| 583,028 | 8/1933 | Germany. |
| 884,015 | 7/1953 | Germany. |

ROBERT B. REEVES, *Primary Examiner.*

F. R. HANDREN, *Assistant Examiner.*

U.S. Cl. X.R.

222—153, 438, 447, 509